(12) United States Patent
Weinblatt et al.

(10) Patent No.: US 7,950,031 B2
(45) Date of Patent: May 24, 2011

(54) INTERACTIVE REWARD ASSOCIATED WITH A BROADCAST

(75) Inventors: Lee S. Weinblatt, Teaneck, NJ (US); Thomas Langer, Teaneck, NJ (US)

(73) Assignee: Lee S. Weinblatt, Teaneck, NJ (US)

( * ) Notice: Subject to any disclaimer, the term of this patent is extended or adjusted under 35 U.S.C. 154(b) by 0 days.

(21) Appl. No.: 12/275,346

(22) Filed: Nov. 21, 2008

(65) Prior Publication Data
US 2009/0077593 A1 Mar. 19, 2009

Related U.S. Application Data

(63) Continuation of application No. 10/080,949, filed on Feb. 20, 2002, now abandoned.

(51) Int. Cl.
  H04N 7/16 (2006.01)
  H04N 7/10 (2006.01)
  H04N 7/025 (2006.01)
(52) U.S. Cl. .......... 725/23; 725/32; 725/34; 725/35
(58) Field of Classification Search .......... 725/23
  See application file for complete search history.

(56) References Cited

U.S. PATENT DOCUMENTS

| | | | |
|---|---|---|---|
| 5,070,404 A | 12/1991 | Bullock et al. | |
| 5,214,792 A | 5/1993 | Alwadish | |
| 5,285,278 A | 2/1994 | Holman et al. | |
| 5,287,181 A * | 2/1994 | Holman | 348/473 |
| 5,579,537 A | 11/1996 | Takahisa et al. | |
| 5,978,013 A | 11/1999 | Jones et al. | |
| 6,282,713 B1 * | 8/2001 | Kitsukawa et al. | 725/36 |
| 6,766,524 B1 * | 7/2004 | Matheny et al. | 725/23 |
| 7,140,032 B2 * | 11/2006 | Dew et al. | 725/46 |
| 2003/0110497 A1 | 6/2003 | Yassin et al. | |
| 2003/0159155 A1 | 8/2003 | Weinblatt et al. | |
| 2003/0172376 A1 | 9/2003 | Coffin, III | |
| 2004/0027619 A1 | 2/2004 | Sato et al. | |

FOREIGN PATENT DOCUMENTS

| | | |
|---|---|---|
| EP | 0 715 426 | 6/1996 |
| EP | 0 891 084 | 1/1999 |

* cited by examiner

*Primary Examiner* — Christopher Kelley
*Assistant Examiner* — Justin E Shepard
(74) *Attorney, Agent, or Firm* — Cohen Pontani Lieberman & Pavane LLP

(57) ABSTRACT

An interactive technique for generating a supplementary, program-related output. A programming signal and a supplementary, program-related data signal are combined into a broadcast signal which is then broadcast from a program signal source. The broadcast signal is received, and the programming signal of the received broadcast signal is performed with reproduction equipment for an audience. The supplementary, program-related data signal of the received broadcast signal is stored, and retrieval of the stored supplementary, program-related data signal is enabled interactively with the programming signal being performed. In response to a control signal being actuated by a member of the audience tuned to the programming signal being performed, the stored supplementary, program-related data signal is retrieved and used to generate the supplementary, program-related output. The supplementary, program-related data signal can be used, for example, to print a reward, such as a discount coupon for purchasing a product advertised as part of the programming signal.

34 Claims, 2 Drawing Sheets

INTERACTIVE REWARD ASSOCIATED WITH A BROADCAST

RELATED APPLICATIONS

This is a continuation of U.S. application Ser. No. 10/080,949 filed Feb. 20, 2002 now abandoned, the entire content of which is hereby incorporated by reference.

FIELD OF THE INVENTION

This invention is directed to an interactive technique applied while an audience is listening to and/or watching a program broadcast from a programming signal source as it is being performed by reproduction equipment and, more particularly, to interactive broadcasting that enables individual members of that audience to readily obtain a supplementary, program-related output, such as a discount coupon.

BACKGROUND OF THE INVENTION

When a program is broadcast, the information it contains may be more limited than the program provider wants to provide and less than the audience member (referred to hereinafter as a "viewer" or "participant") is interested in obtaining. The "program" can be audio and/or video, commercial (e.g. advertisement) and/or non-commercial (e.g. an entertainment show), and is obtained as a programming signal (e.g. a television signal) from a program signal source (e.g. a television station) originated by a program provider (e.g. an advertiser). The "broadcast" of the program can be over the airwaves, cable, satellite, or any other signal transmission medium. This term also applies to playback from recording media such as audio tape, video tape, DAT, CD-ROM, and semiconductor memory. An "audience" for such program reproduction is constituted of the persons who perceive the program.

The program is "performed" by any means which result in some form of perception by human beings, the most common being video and audio. The "reproduction equipment" is any and all types of units to convert a broadcast signal into human perceptible form.

The audience can be described as being "tuned" to a program when the signal source is a TV or radio broadcast station. This term may be less commonly applied when the signal source is a tape recorder, for example. However, for the sake of brevity and convenience, the word "tuned" is applied herein to all situations in which an audience member selects a particular program, whether it be by twisting a dial, operating a remote control, or popping a cassette into a tape recorder for playback.

It can be readily appreciated that TV programs are restricted to a particular length due to the time period allocated to a show, and the high cost charged for broadcasting a commercial advertisement (referred to herein interchangeably as "commercial" or "advertisement") based on its duration. Many illustrations can be given that show the need to provide materials to supplement the show and/or advertisement. For example, consumers may seek detailed information about an advertised product. A news program could provide viewers with historical information about a person or place currently in the news. Government institutions could provide application forms related to announcements for public services. A retailer could make available an incentive reward, such as discount coupons, to purchase its products. Other rewards could also be available, such as free theater tickets for viewers who qualify by participating in a survey or in a game.

All such broadcast program-related materials, in tangible and intangible form, be they information, rewards or anything else, are collectively referred to herein as "supplementary materials". However, for reasons of brevity and convenience, the ensuing discussion related to the present invention will refer only to incentive rewards, or reward coupons, or just "rewards," for short.

It is well known by TV advertisers, for example, that the experience of viewing an advertised product creates an immediate desire in the viewer to purchase that product. This desire has an initially high level of interest during and shortly after the broadcast, but decreases sharply during a falloff period in the hours that follow. However, if the viewer receives an immediate reward while the level of interest is still high, in the form of a reward coupon for example, an incentive is established for the viewer to retain a high level of interest to purchase the product, or at least higher than it would be otherwise, well beyond the falloff period. Also, the prospect of receiving an immediate reward can convert an attitude of annoyance at having a TV show interrupted by an unwanted commercial into an attitude of at least tolerance and perhaps even a degree of interest in the commercial.

Viewers have been provided during broadcasts with telephone numbers and/or website addresses for obtaining the rewards offered by advertisers. However, the need to memorize or write down the telephone numbers and/or URLs is an inconvenience as well as a source for error. Consequently, prior art techniques have been developed for providing interactive access to such rewards. The word "interactive" as utilized herein denotes an activity that takes place during the course of a broadcast. The aim of such interactive access is to enable and facilitate access to the rewards without having to write down or memorize anything. Access should be gained with only a simple manual intervention by the viewer.

Several techniques for interactive access to web sites on the Internet are known. However, such techniques have various shortcomings. For example, they are relatively complex in design and the use of an additional computer with a separate display is required at the viewer end. Also, the interactive access takes over a communication line, such as a telephone line, making it unavailable for its normal use.

SUMMARY OF THE INVENTION

One object of the present invention is to provide an improved interactive technique for obtaining supplementary, program-related outputs, such as rewards.

Another object of the present invention is to provide an effective interactive technique for obtaining such program-related rewards that requires minimal equipment at the viewer end.

A further object of the present invention is to provide an interactive technique for interactively obtaining such program-related rewards that is simple and convenient to use by the viewer.

These and other objects are attained in accordance with one aspect of the present invention directed to an interactive method for generating a supplementary, program-related output, comprising obtaining a programming signal and a supplementary, program-related data signal. The programming signal and the supplementary, program-related data signal are combined into a broadcast signal which is then broadcast from a program signal source. The broadcast signal is received and the programming signal of the received broadcast signal is performed with reproduction equipment for an audience. The supplementary, program-related data signal of the received broadcast signal is stored, and retrieval of the stored supplementary, program-related data signal is enabled interactively with the programming signal being performed. In response to a control signal being actuated by a member of the audience tuned to the programming signal being performed, the stored supplementary, program-related data signal is retrieved and used to generate the supplementary, program-related output.

Another aspect of the invention is directed to an apparatus for interactively generating a supplementary, program-related output. The apparatus includes means for combining a programming signal and a supplementary, program-related data signal into a broadcast signal, and then broadcasting the broadcast signal from a program signal source. Means are provided for receiving the broadcast signal and for performing the programming signal of the received broadcast signal with reproduction equipment for an audience. The supplementary, program-related data signal of the received broadcast signal is stored, and means is provided for enabling retrieval of the stored supplementary, program-related data signal interactively with the programming signal being performed. Responsive to a control signal being actuated by a member of the audience tuned to the programming signal being performed, the stored supplementary, program-related data signal is interactively retrieved and used to generate the supplementary, program-related output.

DETAILED DESCRIPTION OF THE DRAWINGS

Figure 1:
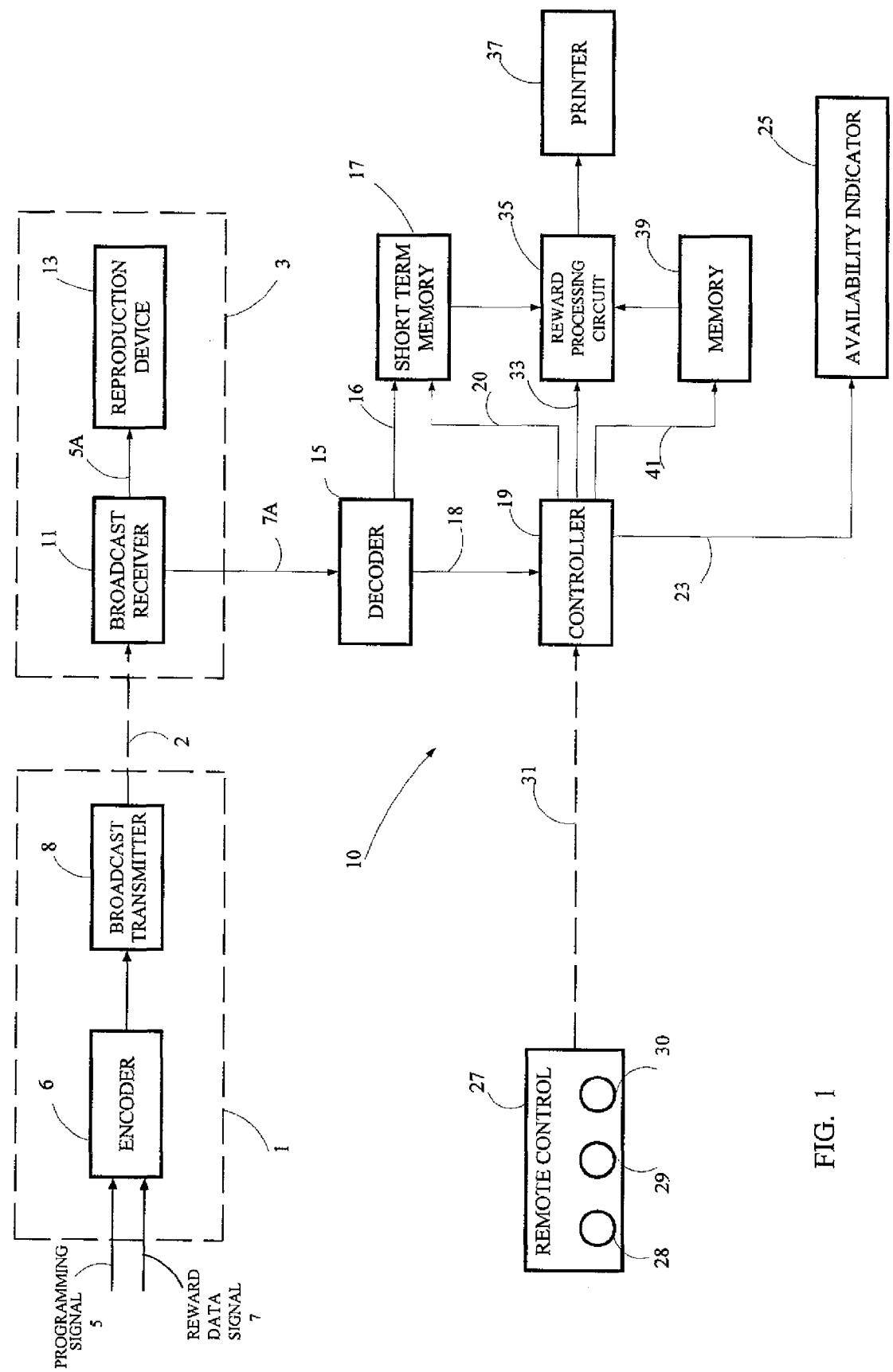
FIG. 1 is a schematic block diagram of the invention.

The present invention relies on the following key components. As shown in FIG. 1, a programming signal source 1, such as a television ("TV") broadcast station, generates an output signal 2 which is a combination of a programming signal 5 and a reward data signal 7. Signal 2 is received by program reproduction apparatus 3 which can be capable of suitably reproducing the programming signal for video and/or audio performance. The received signal 2 is inputted to reward output apparatus 10 which can be manually activated by the viewer, such as with remote control 27, to interactively print a reward on a printer 37.

The present invention is particularly valuable to an advertiser who is offering a discount coupon applicable toward purchase of the product being advertised. Turning now to a more detailed explanation of the present invention, a reward data signal is provided along with the programming signal in order to enable printing a reward coupon interactively with the program to which the viewer is tuned. Thus, the conventional programming signal 5 is encoded by encoder 6 with a reward data signal 7. The term "encoded" is used in the broadest sense to include any and all techniques for combining a programming signal with another signal for broadcasting both together by a well known, commonly used broadcast transmitter 8. At the viewer end, both signals are received, separated, processed and reproduced. The specific technique chosen depends on various design considerations. The reward data signal can be either analog or digital. The encoding, transmission, detection and decoding of such data signals are conventional and readily apparent to anyone with ordinary skill in the art. Such specifics do not form a part of the present invention. Details thereof would add unnecessarily to the length and complexity of this description. Consequently, such details are not provided herein.

In accordance with a key aspect of the present invention, the reward data signal 7 includes all of the data specific to the particular reward coupon that is required to print it. Such data includes, for example, the text, font, formatting, symbols, background color, font color, and the like. All of this data is included in a reward data signal 7, is combined with programming signal 5, and is transmitted along with the programming signal as part of output signal 2. A variation of this approach is presented below in connection with a discussion of memory 39.

Broadcast output signal 2 is received by program reproduction apparatus 3. In particular, receiver 11 processes the received programming signal 5 and inputs it, as signal 5A, to reproduction device 13. Thus, if apparatus 3 is a TV set, receiver 11 could be a tuner, and device 13 is the TV screen. Receiver 11 can include circuitry to extract the programming signal and/or the reward data signal from signal 2. Such circuitry is well known, and thus details thereof are not needed herein.

The reward data signal 7 is provided, as signal 7A, to decoder 15. Alternatively, signal 2 can be inputted directly to decoder 15. Decoder 15 outputs a reward printing signal 16 to short term memory circuit 17. Signal 16 can be identical to signal 7A, it can be a minimally changed version thereof (e.g., amplified), or it can be a substantially changed version, depending on the specific signals and encoding/decoding technique chosen based on well known design considerations.

For example, decoder 15 can accumulate therein all the data required to print one reward coupon, for example. When the accumulation of that data is completed, it could all be transferred into short term memory 17. Alternatively, the accumulation and storage of data for an entire coupon would take place in memory 17 under control of controller 19 (discussed below). In any case, memory 17 stores therein data corresponding to a reward for as long as it needs to be kept available for selection by the viewer interactively with the program being performed and to which the viewer is tuned. When that situation changes, such as when a new reward is offered during that same program, or in a different program to which the viewer is tuned, controller 19 can reset memory 17, and the data for the new reward is stored in the newly reset memory 17.

When decoder 15 detects a reward as part of signal 2, it generates a reward recognition signal 18 to controller 19. This results in controller 19 generating a memory control signal 20 and an indicator output signal 23 to availability indicator 25. Indicator 25 can generate a visual, audible or sensory signal to alert the viewer to the fact that a reward is interactively available during the program to which the viewer is then tuned. The viewer is provided with a handheld, remote control device 27, such as is commonly used with TVs. Such a device includes buttons 28, 29 and 30 depicted for illustrative purposes. Of course, device 27 typically includes many such buttons. Button 30, for example, could be a programmable button on a generally available remote control device, or it would be a specific button on a customized device 27. In any case, when the viewer depresses button 30 in response to an alert received from indicator 25, and due to the interest by the viewer in a reward then being offered, the reward can be interactively printed as follows. As a result of button 30 being depressed, remote control device 27 generates output signal 31 which is inputted to controller 19. The remote control can be connected to controller 19 directly by wire or through remote transmission. In either case, controller 19 responds to signal 31 by generating print control signal 33 to reward processing circuit 35. Reward processing circuit 35 retrieves the reward printing data then stored in short term memory 17, and processes that signal so as to render it suitable for printing by printer 37. Thus, for example, circuit 35 can have stored therein the printer driver particular to the specific printer 37 being used by the viewer.

To summarize, signal 2 broadcast by the TV station 1 includes both a programming signal and a reward data signal for the reward being made available to the viewer for printing the reward interactively during that program. When such a reward is interactively available, the viewer is alerted to this fact by indicator 25. If the viewer chooses to have that reward printed, button 30 on remote control 27 can be depressed to actuate printer 37 to print the reward for which the data is then stored in short term memory 17.

As explained above, a key aspect of the invention is that the reward data signal 7 includes all of the data required to print a specific coupon, and all of that data is transmitted as part of the broadcast output signal 2. The addition of reward data signal 7 to programming signal 5 adds to the data transmission burdens both at the transmitting end and the receiving end. Although text-heavy reward coupons should not normally be too burdensome in this regard, image-heavy coupons may have a more significant impact. In any case, it may be advantageous to limit the amount of additional data that needs to be broadcast due to the inclusion of the reward data signal in output signal 2. One way of doing so is to permanently store at the viewer's location some of the reward data that is required to print a reward coupon and which is common to all interactively available rewards. This data is stored in memory 39. Thus, the common reward printing data is stored in memory 39, whereas only the data specific to one reward is broadcast as part of output signal 2. For example, such common reward printing data could be related to the formatting of the rewards. Thus, when controller 19 receives an output signal 31, it generates another memory control signal 41 to memory 39. This triggers the transfer of information from memory 39 to reward processing circuit 35. Circuit 35 then combines the specific reward printing data from short term memory 17 with the common reward printing data from memory 39, and then transfers the combined printing data to printer 37 for the printing of the reward coupon.

Figure 2:
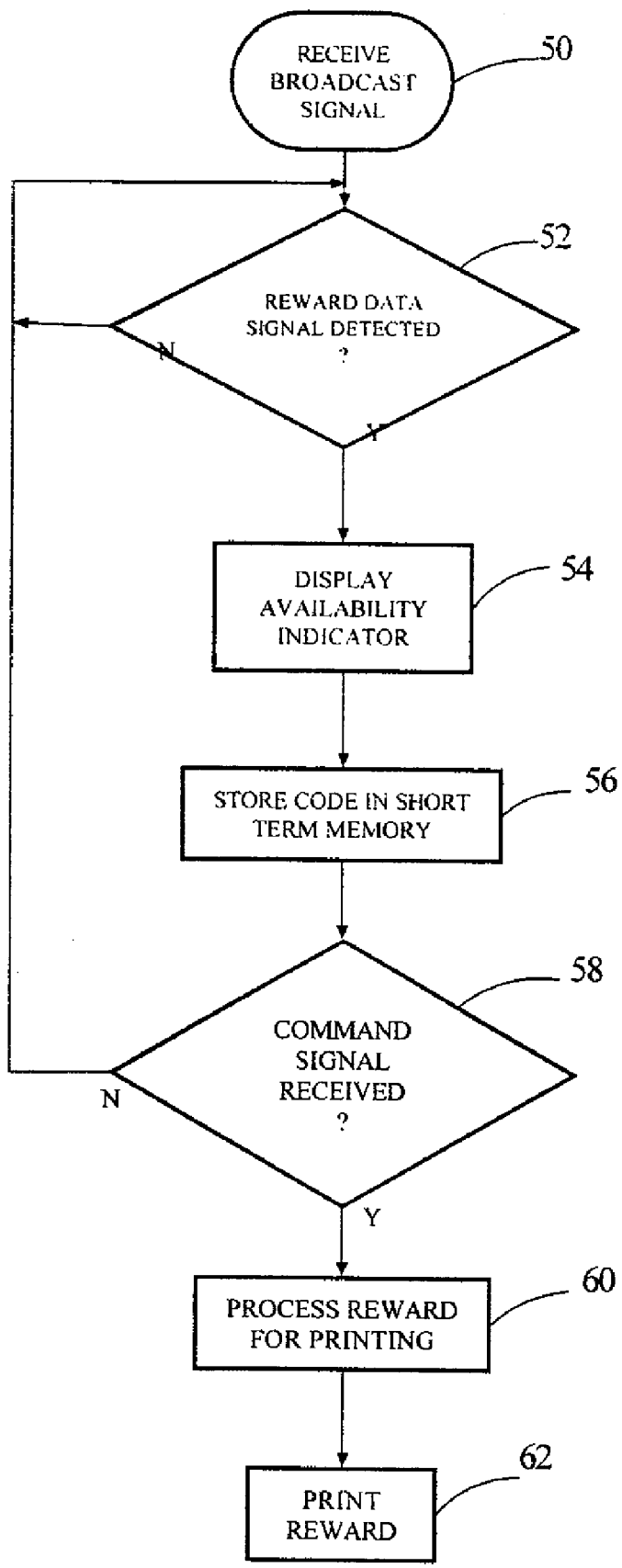
FIG. 2 is a flow chart showing operations performed by the arrangement of FIG. 1.

FIG. 2 shows the flow of operations required to implement the invention with the apparatus depicted in FIG. 1. In particular, broadcast signal 2 is received by apparatus 3, as depicted by 50. The remaining operations depicted in FIG. 2 are performed by controller 19. In particular, controller 19 determines whether decoder 15 has detected a reward data signal, per 52. If it has, then an indicator output signal is generated by controller 19, per 54. Also, controller 19 is responsible for having the reward data for a particular reward coupon stored in short term memory 17, per 56. Controller 19 then also determines whether a print control signal 31 is received from remote control device 27, per 58. If so, then operation 60 sends the signals to reward processing circuit 35 and memories 17 and 39 to collect and process the data required by printer 37 to print a coupon. Finally, printer 37 prints the reward, per 62.

Memory 39 could also have pre-stored therein print data for several different types of formats. Which format is printed depends on a digital bit, for example, included in output signal 2 and processed by controller 19 for input to memory 29 in a well known manner.

Apparatus 3 is a conventional component of a commercially available video and/or audio instrument, such as a TV set. Apparatus 10 could be embodied as a separate box that houses all of its components. Only minimal retrofitting of the TV, for example, would be required in order to implement the invention, such as connecting the broadcast receiver 11 (e.g. TV tuner) to the decoder 15. The connection to the TV set could be with a direct line or by remote signal transmission (e.g. RF, infrared). Other than that, the installation of the box housing apparatus 10 is very simple in that it just needs to be plugged into a wall outlet socket to receive power. Only a one time, fast, simple installation is involved that requires no retrofit of other apparatus in the house.

Alternatively, apparatus 10 could have its circuitry incorporated into the electronics of the TV. For example, the electronics could be fabricated on the semiconductor chip used to control operation of a TV and the viewing of programs on it. Such TV chips are becoming increasingly sophisticated with modern TVs being provided with added functionality approaching that of a computer. The cost of adding such circuitry to a TV chip is minimal considering the large number of chips over which the cost would be spread.

Although a preferred embodiment of the present invention has been described in detail above, various modifications thereto will be readily apparent to anyone with ordinary skill in the art. For example, memories 17 and 39 can be combined. Also, rather than printing the reward as coupon made of paper and ink, the reward data can be outputted to a portable electronic storage device, such as a smartcard. The smartcard could be inserted into a reader at a merchant's shop designed to read the reward data and enable redemption without the necessity to use paper and ink.

Other possible variations include use of printer 37 to print supplemental information other than a reward coupon in place of or in addition to the printing of rewards. Also, indicator 25 can be eliminated by coupling the output signal 23 of controller 19 to the TV inputs so that an icon, for example, is displayed on the screen to provide an effect equivalent to the effect of the indicator. In addition, manual actuation of button 27 to produce signal 31 can be replaced by voice commands, for example. Furthermore, the sequence of steps in the flow charts depicted in the drawings can be modified with equivalent results.

A further variation has to do with the common reward printing data, such as the format or formats, pre-stored in memory 39. It is also feasible to enable the entry of data into memory 39 from a remote station (not shown), as via a suitable wire or wireless communications link (e.g. a telephone line, ISDN line or cable, for example, or a wireless communication system can be used, such as satellite or cellular). This remote entry can be used, for example, to conveniently load new pre-stored formats into memory 39. Various other settable parameters can be set in this manner to provide added convenience and flexibility as features of the invention.

These and all other such modifications are intended to fall within the scope of the present invention as defined by the following claims.

We claim:

1. An interactive method for generating a supplementary, program-related output, comprising:
    obtaining a programming signal;
    obtaining a supplementary, program-related data signal;
    combining said programming signal and said supplementary, program-related data signal into a broadcast signal;
    broadcasting said broadcast signal from a program signal source;
    receiving said broadcast signal;
    performing said programming signal of the received broadcast signal with reproduction equipment for an audience;
    storing said supplementary, program-related data signal of the received broadcast signal;

enabling retrieval of said stored supplementary, program-related data signal interactively with said programming signal being performed; and responding to a control signal actuated by a member of said audience tuned to said programming signal being performed to interactively retrieve said stored supplementary, program-related data signal and to generate said supplementary, program-related output;

wherein a plurality of supplementary, program-related outputs can be generated as a combination of common output data and specific output data, with said common output data being common to at least two of said outputs, and said specific output data being unique to said outputs, respectively;

wherein said supplementary, program-related data signal combined with said programming signal includes said specific output data;

wherein said common output data is pre-stored locally with respective members of said audience for retrieval rather than being broadcast with said programming signal; and wherein said pre-stored common output data is retrieved and combined with said received specific output data to generate said supplementary, program-related output in response to said control signal.

2. The interactive method of claim 1, wherein said supplementary, program-related data signal includes all data necessary to produce a human-perceptible output.

3. The interactive method of claim 2, wherein said output of said stored supplementary, program-related data signal comprises printing.

4. The interactive method of claim 2, wherein said output of said stored supplementary, program-related data signal comprises electronic recordal in a portable device adapted for use in a reader.

5. The interactive method of claim 2, wherein said programming signal is for a commercial to advertise a product, said human-perceptible output is a reward related to purchase of said product, and said supplementary, program-related data signal is a reward data signal.

6. The interactive method of claim 5, wherein said human-perceptible output produced from said reward data signal is a discount coupon.

7. The interactive method of claim 1, wherein said control signal is generated by a handheld, remote control device.

8. The interactive method of claim 1, further comprising generating an indication responsive to said supplementary, program-related data signal being received in said broadcast signal to alert the audience that such a supplementary, program-related output is interactively available with the received programming signal being performed.

9. The interactive method of claim 8, wherein said indication is visual.

10. An interactive method for generating a supplementary, program-related output from a broadcast signal that is a combination of a programming signal and a supplementary, program-related data signal, said method comprising:

receiving said broadcast signal; performing said programming signal of the received broadcast signal with reproduction equipment for an audience;

storing said supplementary, program-related data signal of the received broadcast signal; enabling retrieval of said stored supplementary, program-related data signal interactively with said programming signal being performed; and responding to a control signal actuated by a member of said audience tuned to said programming signal being performed to interactively retrieve said stored supplementary, program-related data signal and to generate said supplementary, program-related output; and wherein a plurality of supplementary, program-related outputs can be generated as a combination of common output data and specific output data, with said common output data being common to at least two of said outputs and said specific output data being unique to said outputs, respectively, with said supplementary, program-related data signal combined with said programming signal including said specific output data;

said method further comprising pre-storing said common output data locally with respective members of said audience for retrieval rather than being broadcast with said programming signal; and retrieving and combining said pre-stored common output data with said received specific output data to generate said supplementary, program-related output in response to said control signal.

11. The interactive method of claim 10, wherein said supplementary, program-related data signal includes all data necessary to produce a human-perceptible output.

12. The interactive method of claim 11, wherein said output of said stored supplementary, program-related data signal comprises printing.

13. The interactive method of claim 11, wherein said output of said stored supplementary, program-related data signal comprises electronic recordal in a portable device adapted for use in a reader.

14. The interactive method of claim 11, wherein said programming signal is for a commercial to advertise a product, said human-perceptible output is a reward related to purchase of said product, and said supplementary, program-related data signal is a reward data signal.

15. The interactive method of claim 14, wherein said human-perceptible output produced from said reward data signal is a discount coupon.

16. The interactive method of claim 10, wherein said control signal is generated by a handheld, remote control device.

17. The interactive method of claim 10, further comprising generating an indication responsive to said supplementary, program-related data signal being received in said broadcast signal to alert the audience that such a supplementary, program-related output is interactively available with the received programming signal being performed.

18. The interactive method of claim 17, wherein said indication is visual.

19. An interactive method for generating a supplementary, program-related output, comprising:

obtaining a programming signal;

obtaining a supplementary, program-related data signal;

combining said programming signal and said supplementary, program-related data signal into a broadcast signal;

broadcasting said broadcast signal from a program signal source;

receiving said broadcast signal;

automatically storing said supplementary, program-related data signal of the received broadcast signal;

performing said programming signal of the received broadcast signal with reproduction equipment for an audience;

enabling access to said supplementary, program-related data signal of the received broadcast signal interactively with said programming signal being performed; and responding to a control signal actuated by a member of said audience tuned to said programming signal being performed to interactively access said supplementary, program-related data signal and to generate said supplementary, program-related output.

20. The interactive method of claim 19, wherein said step of enabling access to said supplementary, program-related data signal comprises storing said supplementary, program-related data signal of the received broadcast signal.

21. An interactive method for generating a supplementary, program-related output, comprising:
obtaining a programming signal;
obtaining a supplementary, program-related data signal;
combining said programming signal and said supplementary, program-related data signal into a broadcast signal;
broadcasting said broadcast signal from a program signal source;
receiving said broadcast signal;
performing said programming signal of the received broadcast signal with reproduction equipment for an audience;
storing said supplementary, program-related data signal of the received broadcast signal interactively with said programming signal being performed;
enabling retrieval of said stored supplementary, program-related data signal; and
responding to a control signal actuated by a member of said audience tuned to said programming signal being performed to retrieve said stored supplementary, program-related data signal and to generate said supplementary, program-related output;
wherein a plurality of supplementary, program-related outputs can be generated as a combination of common output data and specific output data, with said common output data being common to at least two of said outputs, and said specific output data being unique to said outputs, respectively;
wherein said supplementary, program-related data signal combined with said programming signal includes said specific output data;
wherein said common output data is pre-stored locally with respective members of said audience for retrieval rather than being broadcast with said programming signal; and
wherein said pre-stored common output data is retrieved and combined with said received specific output data to generate said supplementary, program-related output in response to said control signal.

22. The interactive method of claim 21, wherein said supplementary, program-related data signal includes all data necessary to produce a human-perceptible output.

23. An apparatus for interactively generating a supplementary, program-related output, comprising:
means for obtaining a programming signal;
means for obtaining a supplementary, program-related data signal;
means for combining said programming signal and said supplementary, program-related data signal into a broadcast signal; means for broadcasting said broadcast signal from a program signal source;
means for receiving said broadcast signal;
means for performing said programming signal of the received broadcast signal with reproduction equipment for an audience;
means for storing said supplementary, program-related data signal of the received broadcast signal;
means for enabling retrieval of said stored supplementary, program-related data signal interactively with said programming signal being performed; and
means for responding to a control signal actuated by a member of said audience tuned to said programming signal being performed to interactively retrieve said stored supplementary, program-related data signal and to generate said supplementary, program-related output;
wherein a plurality of supplementary, program-related outputs can be generated as a combination of common output data and specific output data, with said common output data being common to at least two of said outputs, and said specific output data being unique to said outputs, respectively;
wherein said supplementary, program-related data signal combined with said programming signal includes said specific output data;
wherein said common output data is pre-stored locally with respective members of said audience for retrieval rather than being broadcast with said programming signal; and
wherein said pre-stored common output data is retrieved and combined with said received specific output data to generate said supplementary, program-related output in response to said control signal.

24. The apparatus of claim 23, wherein said supplementary, program-related data signal includes all data necessary to produce a human-perceptible output.

25. The apparatus of claim 24, wherein said output of said stored supplementary, program-related data signal comprises printing.

26. The apparatus of claim 24, wherein said output of said stored supplementary, program-related data signal comprises electronic recordal in a portable device adapted for use in a reader.

27. The apparatus of claim 24, wherein said programming signal is for a commercial to advertise a product, said human-perceptible output is a reward related to purchase of said product, and said supplementary, program-related data signal is a reward data signal.

28. The apparatus of claim 27, wherein said human-perceptible output produced from said reward data signal is a discount coupon.

29. The apparatus of claim 23, wherein said control signal is generated by a handheld, remote control device.

30. The apparatus of claim 23, further comprising means for generating an indication responsive to said supplementary, program-related data signal being received in said broadcast signal to alert the audience that such a supplementary, program-related output is interactively available with the received programming signal being performed.

31. The apparatus of claim 30, wherein said indication is visual.

32. An apparatus for interactively generating a supplementary, program-related output from a broadcast signal that is a combination of a programming signal and a supplementary, program-related data signal, said apparatus comprising:
means for receiving said broadcast signal;
means for performing said programming signal of the received broadcast signal with reproduction equipment for an audience;
means for automatically storing said supplementary, program-related data signal of the received broadcast signal;
means for enabling retrieval of said stored supplementary, program-related data signal interactively with said programming signal being performed; and
means for responding to a control signal actuated by a member of said audience tuned to said programming signal being performed to interactively retrieve said stored supplementary, program-related data signal and to generate said supplementary, program-related output.

33. An apparatus for interactively generating a supplementary, program-related output from a broadcast signal, comprising:
- means for obtaining a programming signal;
- means for obtaining a supplementary, program-related data signal;
- means for combining said programming signal and said supplementary, program-related data signal into a broadcast signal; means for broadcasting said broadcast signal from a program signal source;
- means for receiving said broadcast signal;
- means for automatically storing said supplementary, program-related data signal of the received broadcast signal,
- means for performing said programming signal of the received broadcast signal with reproduction equipment for an audience;
- means for enabling access to said supplementary, program-related data signal of the received broadcast signal interactively with said programming signal being performed; and
- means for responding to a control signal actuated by a member of said audience tuned to said programming signal being performed to interactively access said supplementary, program-related data signal and to generate said supplementary, program-related output.

34. An apparatus for interactively generating a supplementary, program-related output from a broadcast signal, comprising:
- means for obtaining a programming signal;
- means for obtaining a supplementary, program-related data signal;
- means for combining said programming signal and said supplementary, program-related data signal into a broadcast signal;
- means for broadcasting said broadcast signal from a program signal source;
- means for receiving said broadcast signal;
- means for performing said programming signal of the received broadcast signal with reproduction equipment for an audience;
- means for automatically storing said supplementary, program-related data signal of the received broadcast signal interactively with said programming signal being performed;
- means for enabling retrieval of said stored supplementary, program-related data signal; and
- means for responding to a control signal actuated by a member of said audience tuned to said programming signal being performed to retrieve said supplementary, program-related data signal and to generate said supplementary, program-related output.

* * * * *